US009696511B2

(12) United States Patent
Michiels et al.

(10) Patent No.: US 9,696,511 B2
(45) Date of Patent: Jul. 4, 2017

(54) SEALING STRUCTURES FOR OPTICAL CABLE CLOSURE

(71) Applicant: TYCO ELECTRONICS RAYCHEM BVBA, Kessel-Lo (BE)

(72) Inventors: Maarten Michiels, Herent (BE); Paul Joseph Claes, Tremelo (BE)

(73) Assignee: CommScope Connectivity Belgium BVBA (BE)

( * ) Notice: Subject to any disclaimer, the term of this patent is extended or adjusted under 35 U.S.C. 154(b) by 0 days.

(21) Appl. No.: 14/914,127

(22) PCT Filed: Aug. 25, 2014

(86) PCT No.: PCT/EP2014/067999
§ 371 (c)(1),
(2) Date: Feb. 24, 2016

(87) PCT Pub. No.: WO2015/028428
PCT Pub. Date: Mar. 5, 2015

(65) Prior Publication Data
US 2016/0216470 A1 Jul. 28, 2016

Related U.S. Application Data

(60) Provisional application No. 61/869,670, filed on Aug. 24, 2013.

(51) Int. Cl.
*G02B 6/44* (2006.01)
*G02B 6/38* (2006.01)

(52) U.S. Cl.
CPC ......... *G02B 6/4444* (2013.01); *G02B 6/3897* (2013.01); *G02B 6/4446* (2013.01); *G02B 6/4472* (2013.01); *G02B 6/445* (2013.01)

(58) Field of Classification Search
CPC .......... G02B 6/38; G02B 6/3897; G02B 6/44; G02B 6/4444; G02B 6/4446; G02B 6/445; G02B 6/4472
See application file for complete search history.

(56) References Cited

U.S. PATENT DOCUMENTS 7,013,074 B2 3/2006 Battey et al.
7,751,675 B2 7/2010 Holmberg et al.
(Continued)

FOREIGN PATENT DOCUMENTS

EP 0 797 114 A2 9/1997
EP 1 567 902 B1 2/2008

OTHER PUBLICATIONS

International Search Report and Written Opinion for International Application No. PCT/EP2014/067999 mailed Oct. 17, 2014 (11 pages).

*Primary Examiner* — Andrew Jordan
(74) *Attorney, Agent, or Firm* — Merchant & Gould P.C.

(57) ABSTRACT

An optical termination enclosure (100) defines ruggedized adapters at output ports (132); a cable entry port (105) through which an input cable can enter the enclosure; and a sealing arrangement (150) disposed at the cable entry port (105) to seal around the input cable. The sealing arrangement (150) includes a gasket block arrangement (151) defining at least a first cable aperture (108) sized to receive an optical cable; and a retention arrangement (160) to activate the gasket block arrangement (151). The retention arrangement (160) includes a wedge-shaped body (161) and a gel-type sealing member (180).

20 Claims, 16 Drawing Sheets

(56) References Cited

U.S. PATENT DOCUMENTS

| | | |
|---|---|---|
| 8,111,966 B2 | 2/2012 | Holmberg et al. |
| 8,213,760 B2 | 7/2012 | Rudenick et al. |
| 8,718,434 B2 | 5/2014 | Gronvall et al. |
| 8,837,894 B2 | 9/2014 | Holmberg et al. |
| 9,244,238 B2 * | 1/2016 | Claessens ............ G02B 6/4444 |
| 2008/0253730 A1 | 10/2008 | Cox et al. |
| 2010/0027954 A1 | 2/2010 | Gronvall et al. |
| 2012/0230644 A1 | 9/2012 | Marmon et al. |
| 2015/0153532 A1 | 6/2015 | Holmberg et al. |
| 2016/0216470 A1 * | 7/2016 | Michiels .............. G02B 6/3897 |

\* cited by examiner

SEALING STRUCTURES FOR OPTICAL CABLE CLOSURE

CROSS-REFERENCE TO RELATED APPLICATION(S)

This application is a National Stage of PCT/EP2014/067999, filed 25 Aug. 2014, which claims benefit of U.S. Patent Application Ser. No. 61/869,670 filed on Aug. 24, 2013 and which applications are incorporated herein by reference. To the extent appropriate, a claim of priority is made to each of the above disclosed applications.

BACKGROUND

In many traditional communications networks, fiber optic cables have been used to carry data long distances between telecommunication company installations. In such traditional communications networks, other types of cables, such as copper wire loops and coaxial cables, have been used to carry data from telecommunication company installations to homes and businesses. Recently, there has been a movement to extend the fiber optic portion of the communications networks closer to homes and businesses. In some circumstances, the fiber optic portions of the communications networks extend into to the homes and businesses themselves.

Extending the fiber optic portion of a communications network closer to homes and businesses has necessitated the deployment of Optical Termination Enclosures (OTEs). An OTE is an enclosure that is designed to facilitate splicing and termination of one or more fiber optic cables. A typical OTE has a set of cable entry ports through which fiber optic cables enter the OTE. For instance, an OTE may have eight cable entry ports. One or more of the cable entry ports may accommodate "feeder" cables that connect to upstream points, such as telecommunication company installations, in a communications network. One or more of the other cable entry ports may accommodate "drop" cables that connect to downstream points in the communications network, such as homes and businesses.

Extending the fiber optic portion of a communications network closer to homes and businesses has necessitated the deployment of Optical Termination Enclosures (OTEs). An OTE is an enclosure that is designed to facilitate splicing and termination of one or more fiber optic cables. A typical OTE has a set of cable entry ports through which fiber optic cables enter the OTE. For instance, an OTE may have eight cable entry ports. One or more of the cable entry ports may accommodate "feeder" cables that connect to upstream points, such as telecommunication company installations, in a communications network. One or more of the other cable entry ports may accommodate "drop" cables that connect to downstream points in the communications network, such as homes and businesses.

OTEs are frequently mounted on utility poles, walls, utility boxes, and other outdoor surfaces. Because OTEs are mounted outdoors, they are exposed to various environmental elements such as heat, cold, dust, sunlight, rain, snow, plants, animals, and so on. Because the splicing and termination capabilities of an OTE would be destroyed or impaired if such environmental elements were permitted to access the interior of the OTE, it is important to ensure that such environmental elements are not permitted to access the interior of the OTE.

SUMMARY

An optical termination enclosure defines ruggedized adapters at output ports; a cable entry port through which an input cable can enter the enclosure; and a sealing arrangement disposed at the cable entry port to seal around the input cable. The sealing arrangement includes a gasket block arrangement defining at least a first cable aperture sized to receive an optical cable; and a retention arrangement to activate the gasket block arrangement. The retention arrangement includes a wedge-shaped body and a gel-type sealing member.

In certain implementations, the sealing member has closure mating surfaces that taper inwardly from the top of the wedge-shaped body towards a bottom of the wedge-shaped body. A sealing receptacle of the enclosure defines angled sidewalls that abut the tapered closure mating surfaces when the retention arrangement is seated in the sealing receptacle.

In certain implementations, the retention arrangement includes cantilevered flanges forming a pocket in which the gasket block arrangement seats. The flanges apply compressive pressure to the gasket block arrangement.

In certain implementations, the enclosure includes a lower housing member defining a lower gasket channel, an upper housing member defining an upper gasket channel, and a gasket closure to seat in the gasket channels. Portions of the gel-type sealing member are in-line with the gasket channels. The upper housing member includes pressing members disposed in alignment with other portions of the sealing member to increase pressure at the portions of the gel-type sealing member in-line with the gasket channels.

In certain implementations, the sealing receptacle has a first section and a second section. The lower housing part defines cavities at the second section. The sealing member is configured so that portions of the sealing member expand into the cavities when the retention arrangement is disposed in the second section.

In certain implementations, a body of the retention arrangement holds a foam (e.g., silicone foam) block configured to bias a portion of the sealing member towards the gasket block arrangement.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWING

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
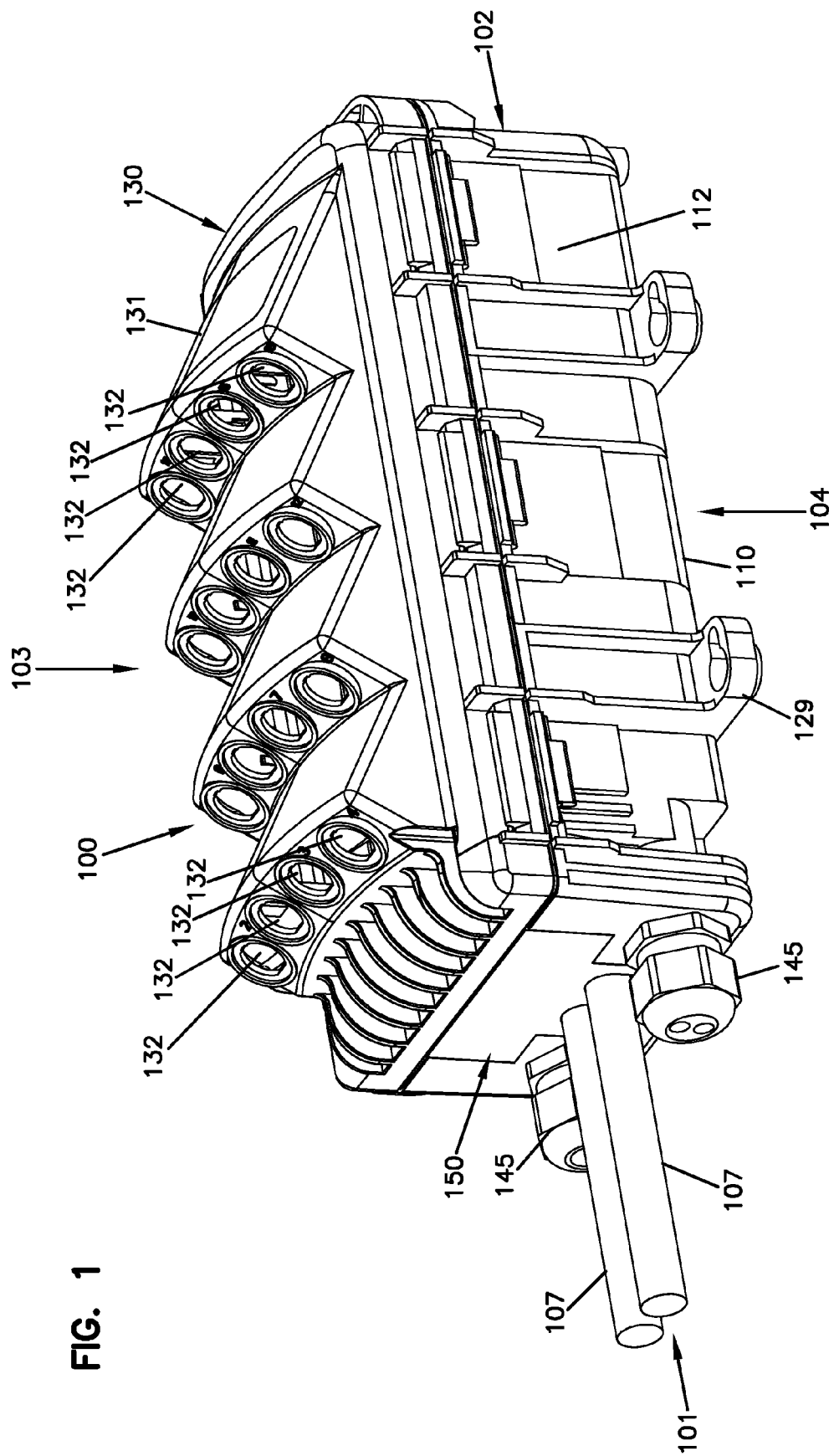
FIG. 1 is a perspective view of an example optical termination enclosure with an upper housing member disposed in a closed position relative to a lower housing member.
Figure 2:
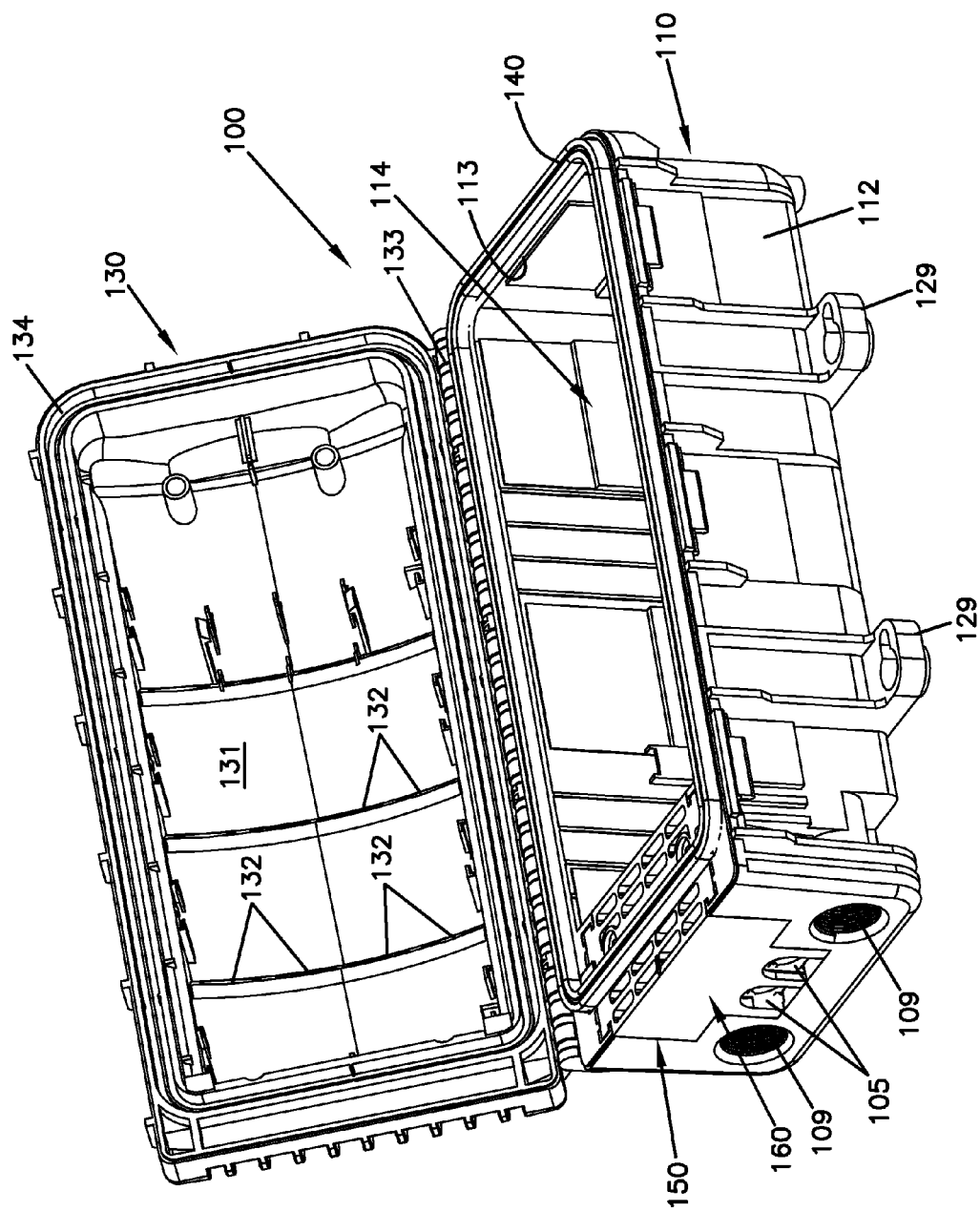
FIG. 2 is a perspective view of the enclosure of FIG. 1 with the upper housing member disposed in an open position relative to the lower housing member.
Figure 3:
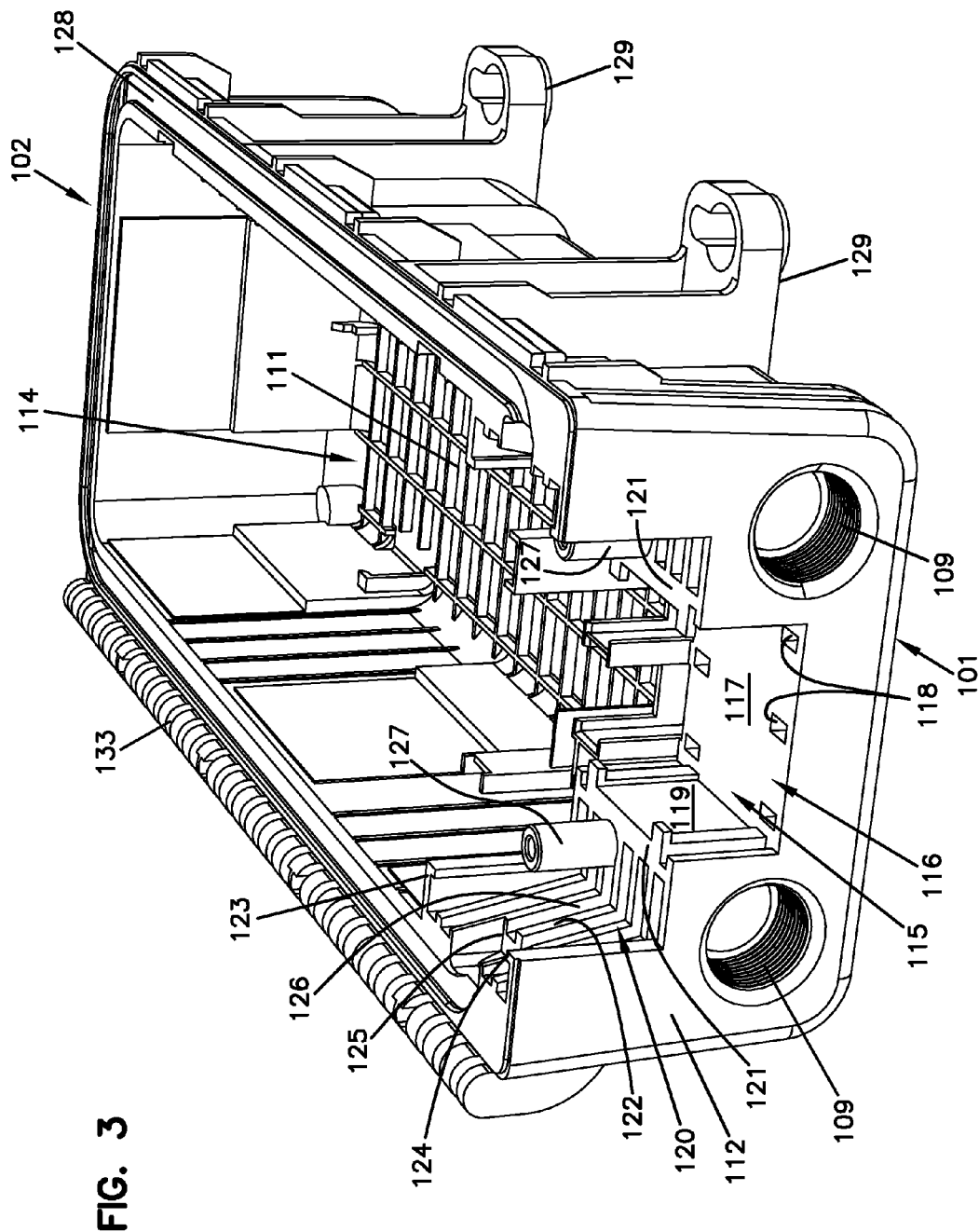
FIG. 3 is a perspective view of the lower housing member of FIG. 1 with the upper housing member and a sealing arrangement removed for ease in viewing.
Figure 4:
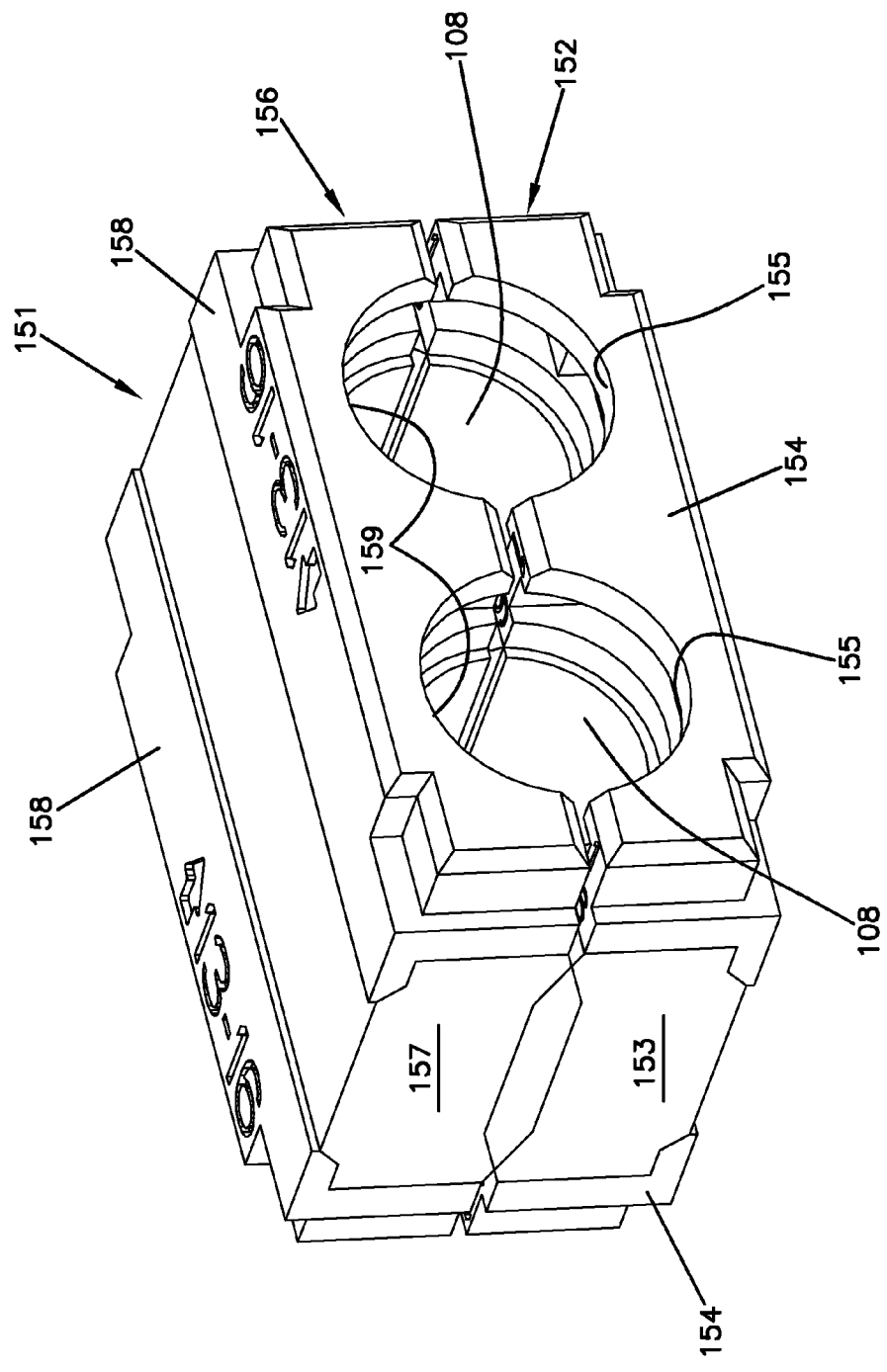
FIG. 4 is a perspective view of an example gasket block arrangement suitable for use with a sealing arrangement in accordance with the principles of the present disclosure.

FIGS. 1-3 illustrate an example optical termination enclosure 100 including a lower housing member 110 and an upper housing member 130 that cooperate to close an inner cavity 114 (FIG. 2). The upper housing member 130 has a body 131 defining one or more output ports 132 at which output cables (e.g., drop cables) can be connected to the enclosure 100. In certain implementations, the enclosure 100 also can define one or more additional ports 109 at which glands 145 can be mounted to enable additional cables (e.g., output cables, input cables, etc.) to enter/exit the enclosure 100.

The lower housing member 110 defines at least one cable port 105 (FIG. 2) at which a cable 107 (e.g., an input cable) can enter the enclosure 100. In the example shown, the lower housing member 110 defines two cable ports 105. In another example, the lower housing member 110 defines four cable ports 105. In some implementations, the cable 107 is an input cable having one or more fibers that can be optically coupled to fibers of the output cables exiting the enclosure through the output ports 132 and/or glands 145. In other implementations, the cable 107 is an output cable having one or more fibers connected to an input cable entering the enclosure 100 at the glands 145.

The optical termination enclosure 100 has a first end 101, a second end 102, a front 103, and a rear 104. The cable port 105 is defined at the first end 101 of the enclosure 100. In the example shown, the output ports 132 face the first end 101 of the enclosure 100. In other implementations, however, the input and output ports 105, 132 can be provided at any desired side of the enclosure 100. In certain implementations, the first end 101 of the enclosure 100 also can define the additional ports 109. The enclosure 100 includes brackets 129 that enable the enclosure 100 to be mounted to a wall, pole, or other surface. In the example shown, the brackets 129 are located at the rear 104 of the enclosure 100.

The upper housing member 130 is mounted to the lower housing member 110 to move (e.g., pivot) between a closed position and an open position. For example, the upper housing member 130 can be mounted to the lower housing member 110 using a pivot hinge 133 (FIG. 2). The upper housing member 130 covers the open top 113 of the lower housing member 110 and closes the inner cavity 114 when the upper housing member 130 is in the closed position (e.g., see FIG. 1). The upper housing member 130 allows access to the inner cavity 114 when the upper housing member 130 is in the open position (e.g., see FIG. 2).

As shown in FIGS. 2 and 3, the lower housing member 110 includes a peripheral wall 112 extending upwardly from a base 111 (FIG. 3). The peripheral wall 112 defines an open top 113 of the lower housing member 110. A lower gasket channel 128 is at least partially defined at the open top 113 of the lower housing member 110. The upper housing member 130 defines an upper gasket channel 134 that aligns with the lower gasket channel 128 when the upper housing member 130 is disposed in the closed position. A closure gasket 140 (FIG. 2) can be disposed in the upper and lower gasket channels 128, 134 to provide a sealing interface between the lower and upper housing members 110, 130.

As shown in FIG. 3, the enclosure 100 defines a sealing receptacle 115 at which a sealing arrangement 150 (FIGS. 4-13) is disposed. The sealing arrangement 150 allows the input cable(s) 107 to enter the enclosure 100 while inhibiting dirt, water, or other contaminants to enter the enclosure 100. The sealing receptacle 115 extends through the peripheral wall 112 at the first end of the first housing member 110 and extends into the first housing member 110. The sealing receptacle 115 includes a first section 116 and a second section 120. The first section 116 has a first retention surface 117 facing towards the open top 113 of the lower housing member 110. The first retention surface 117 defines openings 118 therein. The first section 116 also includes sidewalls 119 extending upwardly from the first retention surface 117.

The second section 120 includes a second retentions surface 121 that is broken by the first section 116 of the sealing receptacle 115. Angled walls 122 extend upwardly from the second retention surface 121 towards opposite sides of the first housing member 110. In certain implementations, each sidewall 122 can define one or more cavities 126. For example, the cavities 126 may be formed between raised ribs. Rearward flanges 123 extend inwardly from the angled sidewalls 122. The second section 120 extends between rearward flanges 123 and peripheral wall 112 at the first end 101 of the enclosure 100. Forward flanges 124 extend rearwardly from the peripheral wall 112 at opposite sides of the sealing receptacle 115. Recessed section 125 is defined in the angled sidewalls 122.

The sealing arrangement 150 includes a gasket block arrangement 151 (FIG. 4) and a retention arrangement 160 (FIGS. 6-9) that cooperate to seal the enclosure 100 at the sealing receptacle 115. One or both arrangements 151, 160 may include gel-type seals. The gel may, for example, comprise silicone gel, urea gel, urethane gel, thermoplastic gel, or any suitable gel or geloid sealing material. Gels are normally substantially incompressible when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other embodiments, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). The sealing members can also include additives such as moisture scavengers, antioxidants, tackifiers, pigments and/or fungicides. In certain embodiments, sealing members in accordance with the principles of the present disclosure have ultimate elongations greater than 100 percent with substantially elastic deformation to an elongation of at least 100 percent. In other embodiments, sealing members in accordance with the principles of the present disclosure have ultimate elongations of at least 200 percent, or at least 500 percent, or at least 1000 percent. Ultimate elongation can be determined by the testing protocol set forth at ASTM D412.

The gasket block arrangement 151 defines at least one aperture 108 through which an input cable 107 can enter the enclosure 100. In the example shown in FIG. 4, the gasket block arrangement 151 defines two apertures 108. In some implementations, two input cables 107 can enter the enclosure 100 using the two apertures 108. In other implementations, a single input cable 107 can enter the enclosure 100 through one aperture 108 and exit the enclosure 100 through the other aperture 108. In certain implementations, the sealing arrangement 150 can include multiple gasket block arrangements 151 disposed at one or more ends of the enclosure 100.

In some implementations, the gasket block arrangement 151 is a monolithic piece defining slits leading to the apertures 108. In other implementations, the gasket block arrangement 151 includes a lower part 152 and an upper part 156. Each of the lower and upper parts 152, 156 includes a gel-type seal block 153, 157 held between two retainers 154, 158, respectively. Facing surfaces of the lower and upper parts 152, 156 define channels 155, 159, respectively, that align to form the apertures 108. The gel blocks 153, 157 are configured to expand around the input cables 107 routed through the apertures 108 when pressure is applied to the gel blocks 153, 157.

Figure 5:
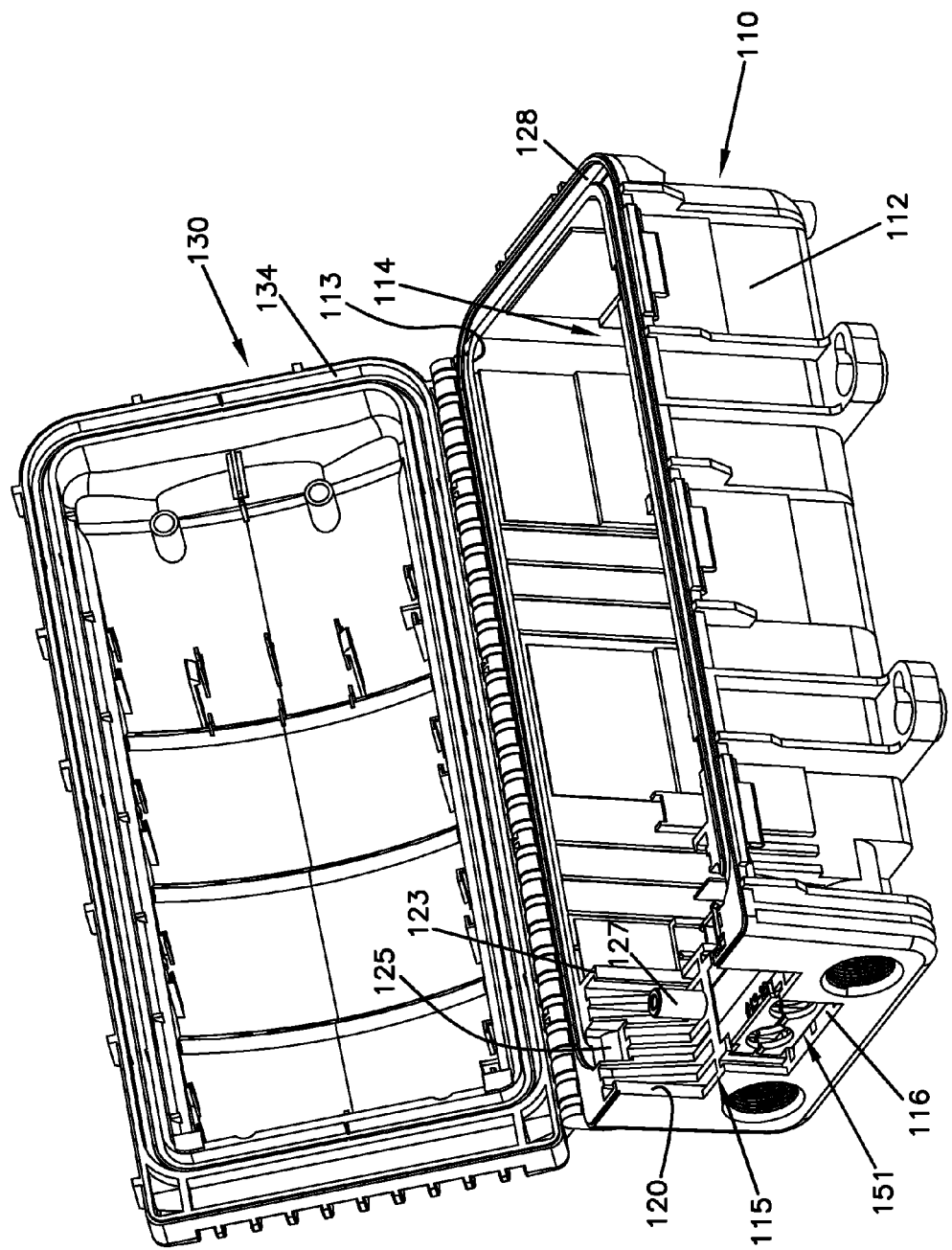
FIG. 5 is a perspective view of the enclosure of FIG. 3 with the gasket block arrangement mounted in a sealing receptacle of the lower housing member.
Figure 6:
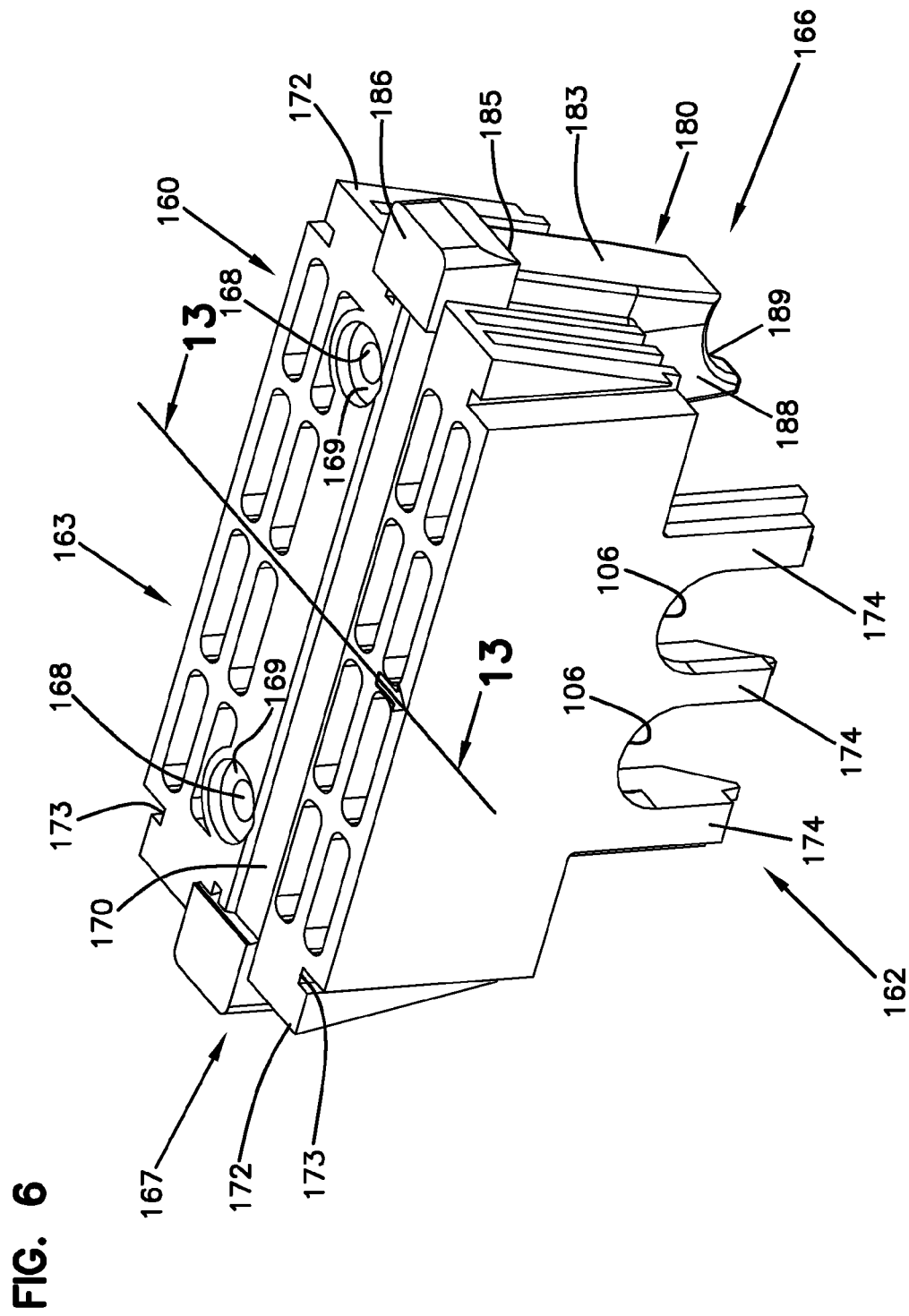
FIG. 6 is a top perspective view of an example retention arrangement suitable for use with the gasket block arrangement of FIG. 4.

As shown in FIG. 5, the gasket block arrangement 151 is disposed in the first section 116 of the sealing receptacle 115. The lower part 152 of the gasket block arrangement 151 seats on the first retention surface 117. The upper part 156 of the gel block arrangement 151 is about even with the second retention surface 121. As shown in FIG. 2, a retention arrangement 160 is disposed in the second section 120 of the sealing receptacle 115 to hold the gasket block arrangement 151 in the first section 116. The retention arrangement 160 provides a compressive force to the gasket block arrangement 151 to activate the seal around the input cables 107. The retention arrangement 160 also seals the remainder of the sealing receptacle 115 against the outside environment.

FIGS. 6-9 illustrate one example retention arrangement 160 including a sealing member 180 coupled to a body 161. In certain implementations, the sealing member 180 is a gel-type seal. In other implementations, the sealing member 180 can include rubber or other such elastomeric material. The body 161 of the retention arrangement 160 is configured to seat on the gasket block arrangement 151 and on the second retention surface 121 of the sealing receptacle 115. Flanges 174 extend outwardly from the body 161 and over opposite ends of the gasket block arrangement 151. The flanges 174 define channels 106 that align with apertures 108 of the gasket block arrangement 151 to define the cable input ports 105.

The body 161 of the retention arrangement 160 has a front 162, a rear 163, a top 164, a bottom 165, a first side 166, and a second side 167. The flanges 174 extend downwardly from the bottom 165 of the body 161 at the front 162 and rear 163 of the body 161. In the example shown, three flanges 174 extend downwardly from the front 162 and three flanges 174 extend downwardly from the rear 163. In other implementations, however, any desired number of flanges 174 can extend from the body 161. The flanges 174 define a pocket 193 (see FIGS. 7 and 9) in which the gasket block arrangement 151 can be disposed.

The pocket 193 is sized relative to the gasket block arrangement 151 so that the flanges 174 provide a compression pressure against the gel blocks 153, 157. Distal ends of the flanges 174 define camming surfaces 175 that aid in mounting the retention arrangement 160 over the gasket block arrangement 151. The flanges 174 flex outwardly as the camming surfaces 175 ride over the retainers 154, 158 of the gasket block arrangement 151. In certain implementations, retention hooks 176 are provided at the distal ends of the flanges 174 to inhibit the flanges 174 from flexing too far. The retention hooks 176 are sized and shaped to extend into the openings 118 defined in the first retention surface 117 of the first section 116 of the sealing receptacle 115. The interaction between the hooks 176 and the openings 118 retains the flanges 174 in a position to apply a compressive force against the gasket block arrangement 151.

Fastener apertures 168 also are defined in the top 164 of the retention arrangement body 161. The fastener apertures 168 align with fastener receptacles 127 (FIG. 3) disposed in the second section 120 of the sealing receptacle 115. Fasteners (e.g., screws, bolts, pins, etc.) 194 can be inserted through the fastener apertures 168 of the retention arrangement body 161 and into the fastener receptacles 127 to secure the retention arrangement 160 to the lower housing member 110 at the sealing receptacle 115. In certain implementations, the top 164 of the body 161 defines recessed surfaces 169 around the fastener apertures 168 to enable fastener heads to sink into the top 164 of the body 161.

Figure 10:
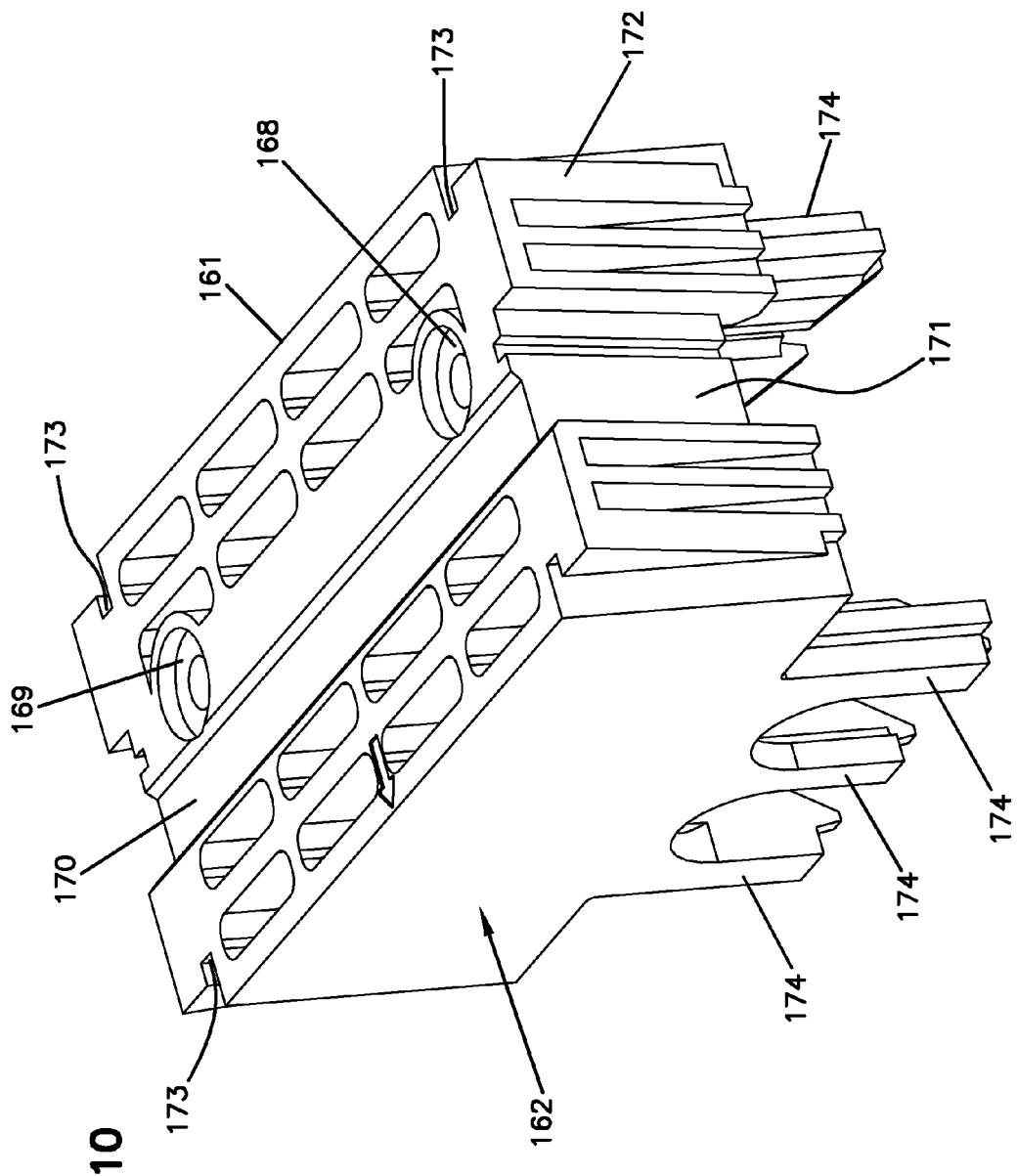
FIG. 10 is a top perspective view of the retention arrangement of FIG. 6 with a gel-type sealing member removed.
Figure 11:
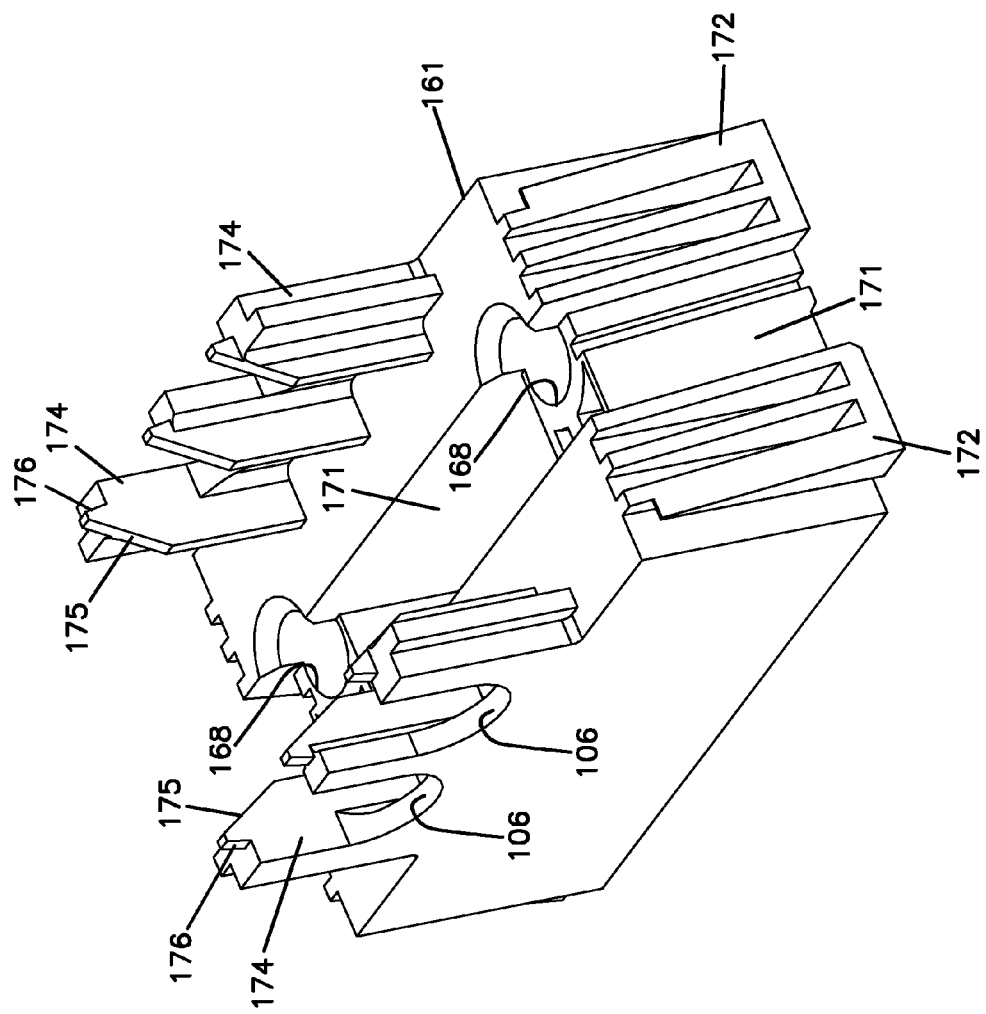
FIG. 11 is a bottom perspective view of the retention arrangement of FIG. 10.

FIGS. 10 and 11 illustrate the retention arrangement body 161 with the sealing member 180 removed for ease in viewing. The body 161 defines a sealing member channel 171 that extends across a bottom 165 of the body 161 and up along the sides 166, 167 of the body 161. As shown in FIG. 11, the fastener apertures 168 may extend through a portion of the sealing member channel 171. The sides 166, 167 of the body 161 include tapered structures 172 that taper outwardly as the structures 172 extend from the bottom 165 of the body 161 towards the top 164. The tapered structures 172 define flange receiving channels 173 accessible from the front 162 and rear 163 of the body 161. As shown in FIG. 2, the flange receiving channels 173 are sized and shaped to receive the rearward and forward flanges 123, 124 (see FIG. 3) of the lower housing member 110 when the retention arrangement 160 is mounted at the sealing receptacle 115.

Figure 12:
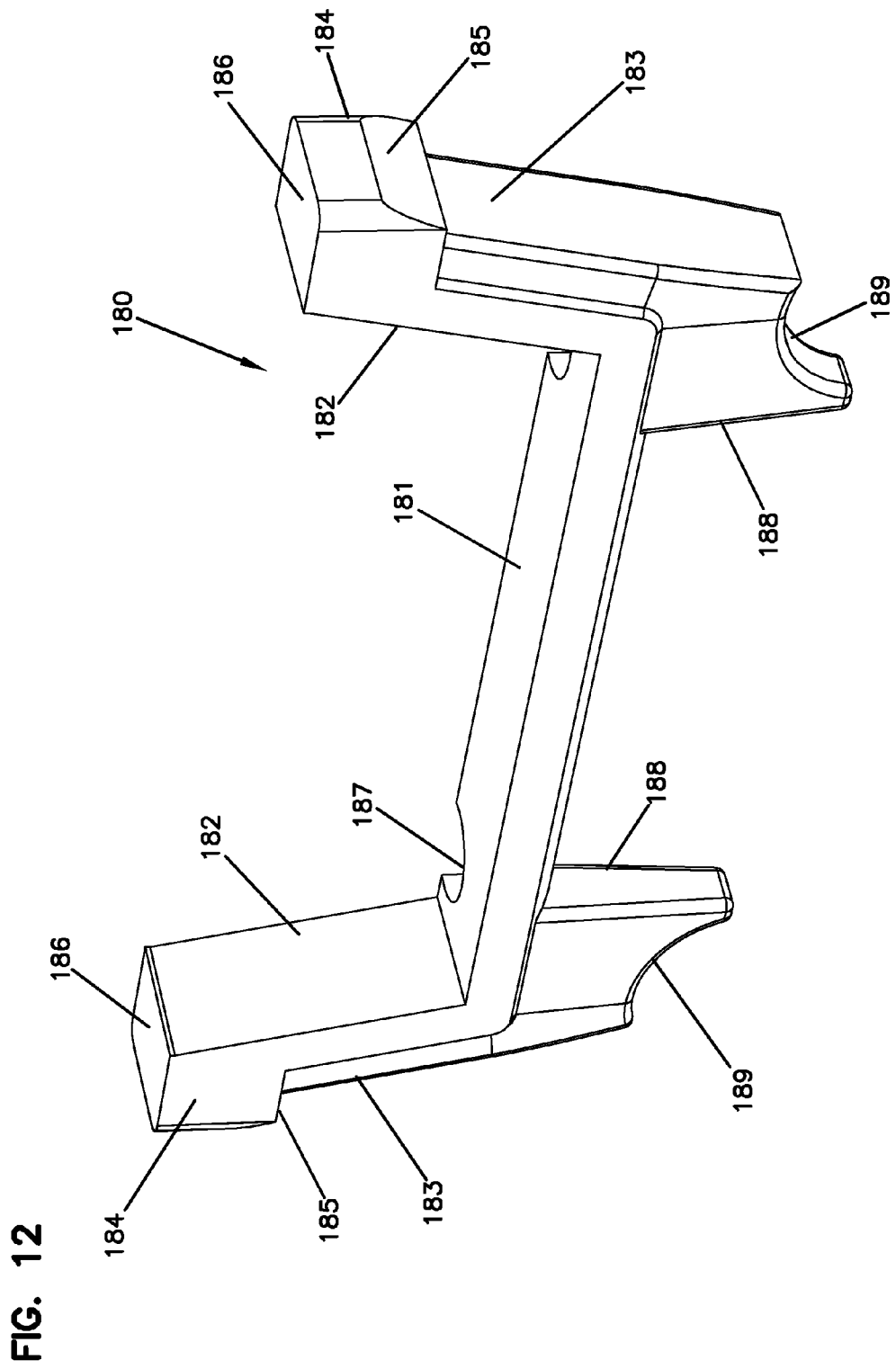
FIG. 12 is a perspective view of an example sealing member for use in the retention arrangement of FIG. 6.

FIG. 12 illustrates one example sealing member 180 suitable for use with the retention arrangement body 161 of FIGS. 10 and 11. In some implementations, the sealing member 180 includes a pressurized gel-type seal. The sealing member 180 includes arms 182 extending upwardly from a first portion 181. Enlarged sections 184 are provided at distal ends of the arms 182. In certain implementations, fastener apertures 187 are partially or wholly defined in the first portion 181. The enlarged sections 184 define upwardly facing surfaces 186 and undercut surfaces 185. Outwardly facing closure mating surfaces 183 extend along the arms 182 from the undercut surfaces 185 of the enlarged sections 184 to the first portion 181.

In some implementations, legs 188 can extend downwardly from the first portion 181. In certain implementations, recesses 189 can be cut into the distal ends of the legs 188. In certain implementations, the closure mating surfaces 183 also extend along the legs 188 to the recesses 189 of the legs 188. In certain implementations, the legs 188 can be notched to accommodate the fastener receptacles 127 and/or fasteners 194.

Figure 13:
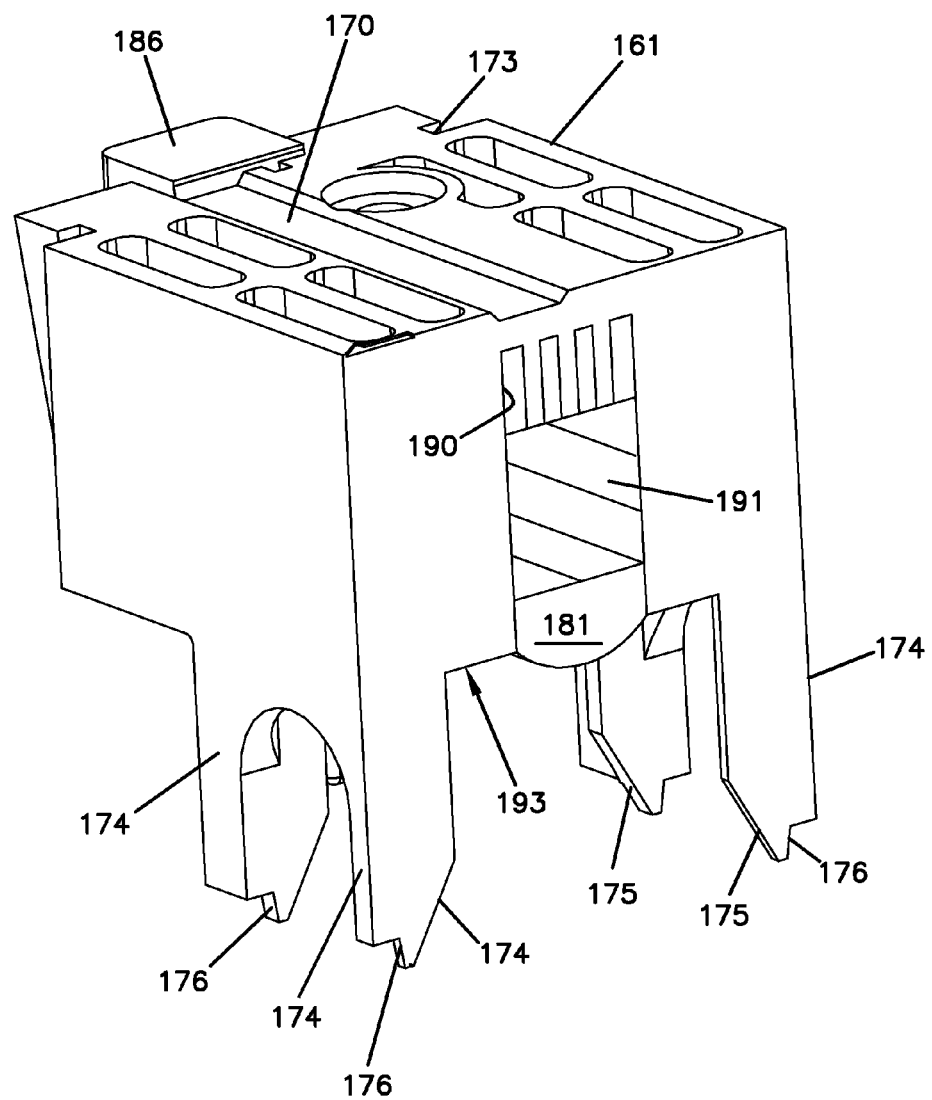
FIG. 13 is a cross-sectional view taken along the line 13-13 of FIG. 6.

As shown in FIG. 13, the first portion 181 of the sealing member 180 extends across the bottom 165 of the retention arrangement body 161 when the sealing member 180 is disposed in the sealing member channel 171 of the body 161. In the example shown in FIG. 13, the first portion 181 of the sealing member 180 protrudes into the pocket 193. The body 161 can define a cavity 190 in which a biasing block 191 can be disposed. In some examples, the biasing block 191 can include a polymeric foam (e.g., open cell or closed cell), such as silicone foam.

When the retention arrangement 160 is mounted over the gasket block arrangement 151, the first portion 181 of the sealing member 180 is pressed by the gasket block arrangement 151 against the biasing block 191 to compress the biasing block 191 against the body 161. In some implementations, the biasing block 191 stores compressive energy applied by the sealing member 180. Accordingly, the biasing block 191 applies pressure against the first portion 181 of the sealing member 180 to bias the first portion 181 towards the pocket 193 when the biasing block 191 is compressed. This pressure may compensate for oil loss from the sealing member 180 over time.

Figure 7:
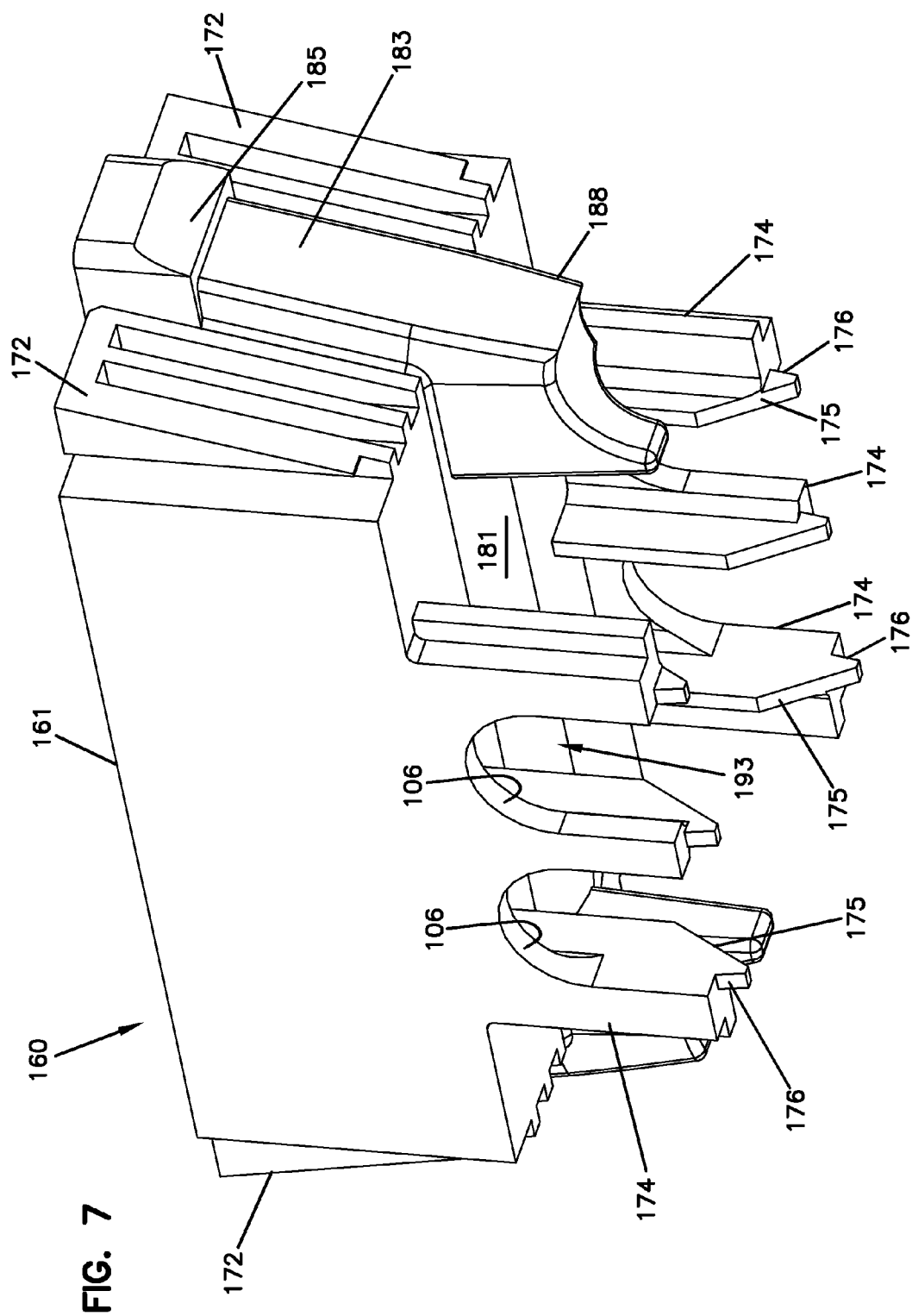
FIG. 7 is a bottom perspective view of the retention arrangement of FIG. 6.
Figure 8:
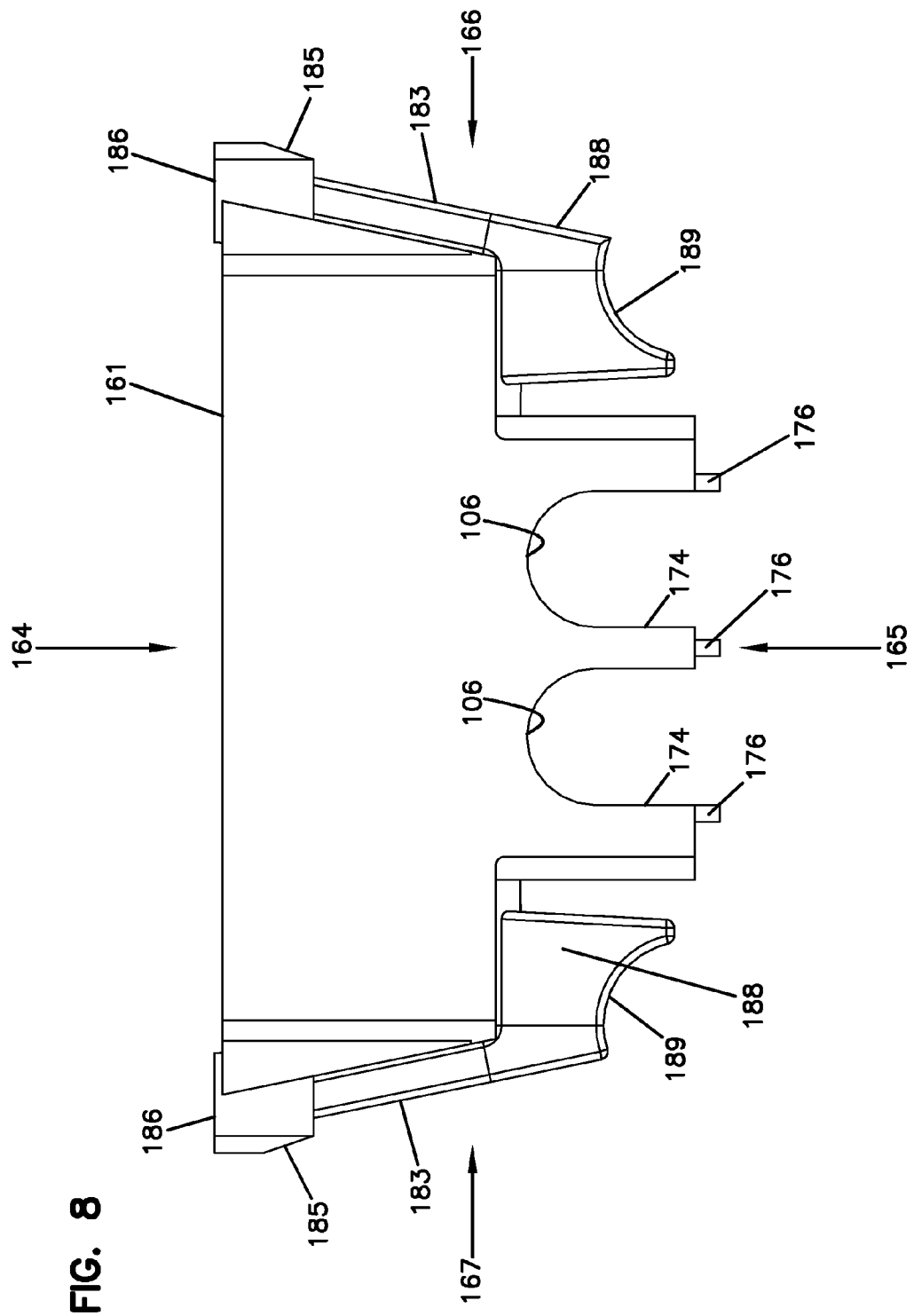
FIG. 8 is a front elevational view of the retention arrangement of FIG. 6.
Figure 9:
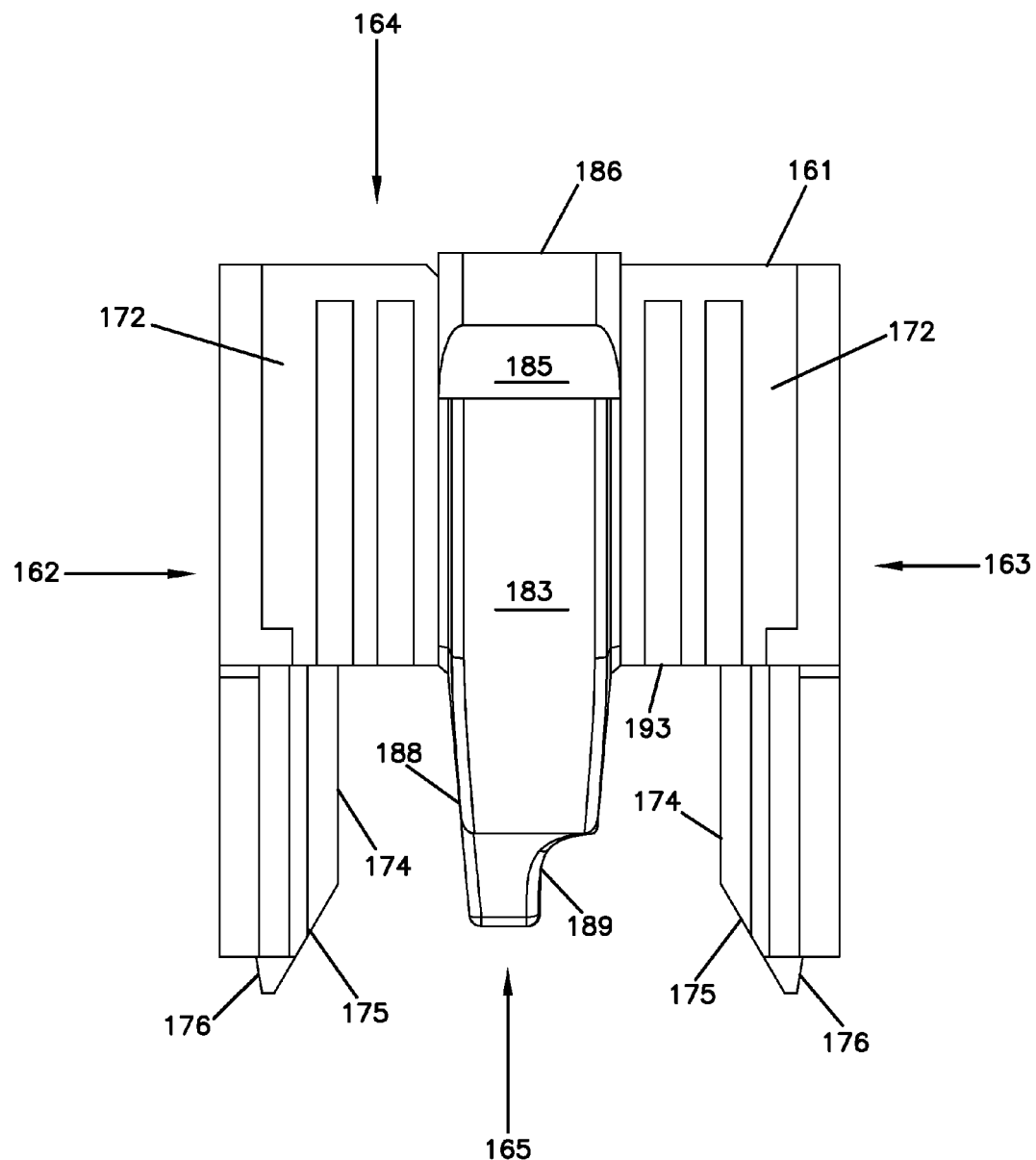
FIG. 9 is an end view of the retention arrangement of FIG. 6.

As shown in FIG. 7, the legs 188 of the sealing member 180 extend downwardly from the bottom 165 of the body 161 to further define the pocket 193. The recesses 189 face outwardly from the pocket 193. The arms 182 of the sealing member 180 extend over the sides 166, 167 of the body 161 so that the upwardly facing surfaces 186 are accessible from the top 164 of the body 161. In the example shown in FIG. 13, the upwardly facing surfaces 186 are elevated relative to the top 164 of the body 161. In other implementations, however, the upwardly facing surfaces 186 can be flush with or recessed relative to the top 164 of the body 161. The closure mating surfaces 183 are spaced outwardly from the tapered structures 172 of the body 161.

When the retention arrangement 160 is mounted to the second section 120 of the sealing receptacle 115, the retention arrangement 160 is lowered into the second section 120 through the open top 113 of the lower housing member 110. The enlarged sections 184 of the sealing member 180 are sized to fit in the recessed sections 125 of the sidewalls 122. In certain implementations, the fastener apertures 168, 187 of the retention arrangement 160 are configured to at least partially receive the fastener receptacles 127 at the second section 120 of the sealing receptacle 115. Fasteners 194 are inserted through the apertures 168, 187 and into the receptacles 127 to secure the retention arrangement 160 to the lower housing member 110.

Because the closure mating surfaces 183 and the sidewalls 122 of the second section 120 are angled, the closure mating surfaces 183 are inhibited from contacting the sidewalls 122 until the retention arrangement 160 is seated in the second section 120. In certain implementations, portions of the closure mating surfaces 183 expand into the cavities 126 defined in the sidewalls 122 when pressure is applied to the sealing member 180. For example, the portions may expand into the cavities 126 when the fasteners 194 are tightened. The resilient nature of the sealing member 180 causes energy to be stored in the portions disposed in the cavities 126. The energy stored in the biasing block 191 and/or the energy stored in the sealing portions disposed in the cavities provides sufficient energy to compensate for oil loss from the sealing member 180 and/or gel blocks 153, 157 over time.

Figure 14:
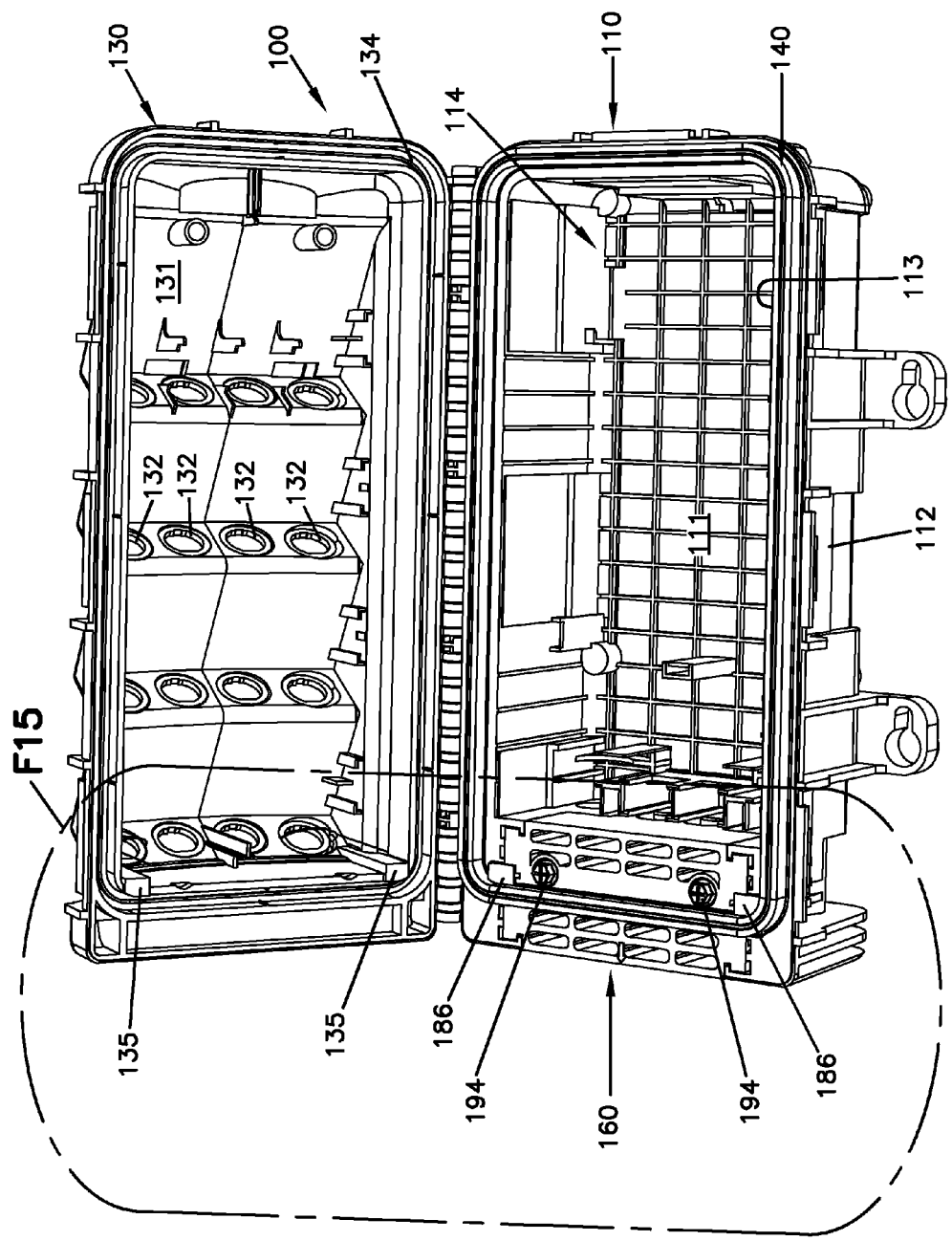
FIG. 14 is another perspective view of the enclosure of FIG. 2.
Figure 15:
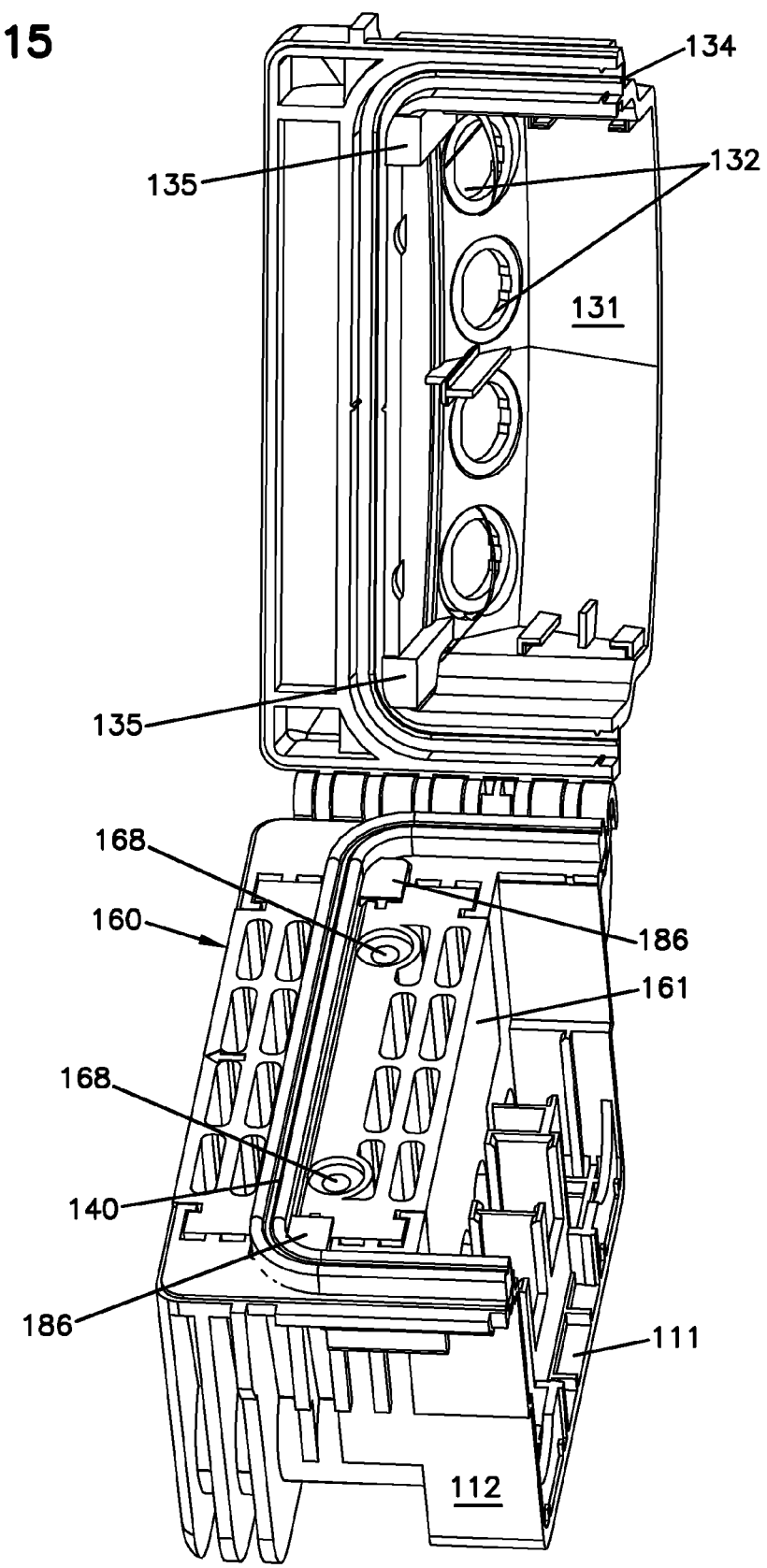
FIG. 15 is an enlarged view of a section of FIG. 14 with the fasteners removed for ease of viewing.

Referring to FIGS. 14 and 15, the closure gasket 140 that seals the interface between the lower and upper housing members 110, 130 extends across at least a portion of the sealing member 180 of the retention arrangement 160. For example, the top 164 of the retention arrangement body 161 also defines a gasket channel 170 that extends between the first and second sides 166, 167 (see FIGS. 6 and 10). The gasket channel 170 cooperates with the portion of the lower gasket channel 128 of the lower housing member 110 to form the lower gasket channel 128. Accordingly, the closure gasket 140 extends across the retention arrangement 160 when mounted to the lower housing member 110.

Each upwardly facing surface 186 of the sealing member 180 has a first portion disposed across the lower gasket channel 128 and a second portion not disposed across the lower gasket channel 128. Accordingly, the closure gasket 140 will extend across the first portions of the upwardly facing surfaces 186 (see FIGS. 14 and 15). In the example shown, the second portions of the upwardly facing surfaces 186 are disposed inside a boundary created by the lower gasket channel 128. In other implementations, however, the second portions can be disposed outside the boundary.

In some cases, the sealing member 180 is sufficiently compressed to that the upwardly facing surfaces 186 may provide sufficient support to the closure gasket 140 to form a useful seal. In other cases, however, the upwardly facing surfaces 186 alone may provide insufficient support to the closure gasket 140 to form a useful seal. In some implementations, the upper housing member 130 may include pressing members 135 that are positioned to align with the second portions of the upwardly facing surfaces 186 when the upper housing member 130 is disposed in the closed position. The pressing members 135 are configured to apply pressure to the second portions of the upwardly facing surfaces 186, thereby building pressure in the first portions of the upwardly facing surfaces 186. The additional pressure in the first portions of the upwardly facing surfaces 186 may provide sufficient support to the closure gasket 140 to form a useful seal.

Figure 16:
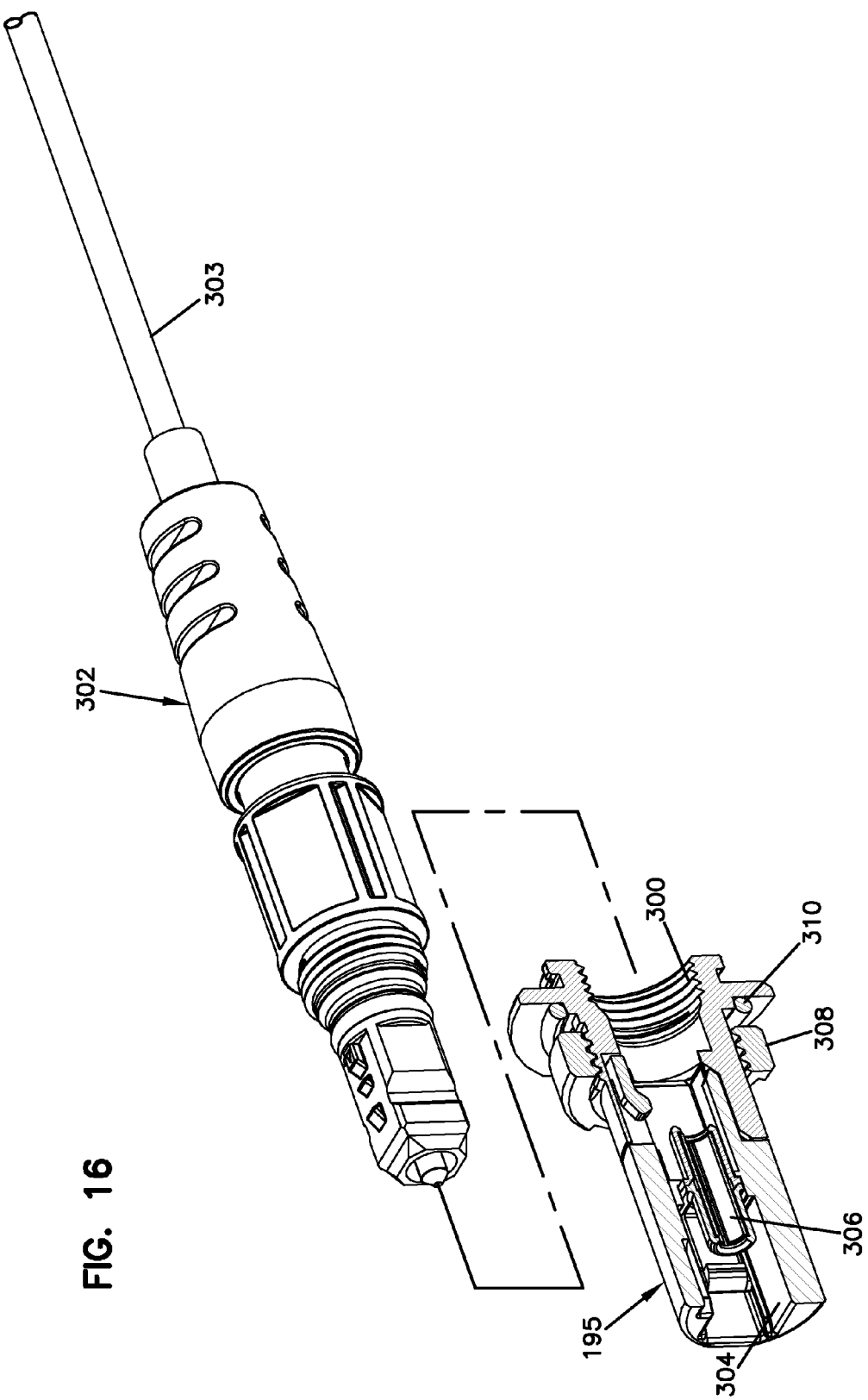
FIG. 16 shows a ruggedized connector and a ruggedized adapter that are examples of adapter/connector combinations that can be installed in the enclosures in accordance with the principles of the present disclosure.

FIG. 16 shows one example ruggedized adapter 195 suitable for use at the cable ports 302 of the upper housing member 130. The ruggedized adapters 195 can include both outer ports 300 that receive ruggedized connectors 302 terminating output cables 303 and inner ports 304 that receive the connectorized ends of input cable fibers, splitter pigtail, and/or splice pigtails. The ruggedized adapters 195 can include alignment sleeves 306 for aligning the ferrules of the connectors desired to be optically coupled together. Each adapter 195 can include a nut 308 that threads on the main body of the adapter 195 to secure the adapter 195 at a given port 132. Each adapter 195 includes a seal 310 that fits on a recessed surface of the corresponding port 132 to seal the adapter 195 relative to the upper housing member body 131. Similarly, any glands 145 mounted at the additional ports 109 also can be ruggedized.

The above specification, examples and data provide a complete sealing and retention arrangement description of the manufacture and use of the composition of the invention.

Since many embodiments of the invention can be made without departing from the spirit and scope of the invention, the invention resides in the claims hereinafter appended.

LIST OF REFERENCE NUMERALS AND CORRESPONDING FEATURES 100 optical termination enclosure
101 first end
102 second end
103 front
104 rear
105 cable input port
106 channels
107 input cable
108 aperture
109 additional ports
110 lower housing member
111 base
112 peripheral wall
113 open top
114 inner cavity
115 sealing receptacle
116 first section
117 first retention surface
118 openings
119 first side walls
120 second section
121 second retention surface
122 angled side walls
123 rearward flange
124 forward flange
125 recessed sections for gel
126 cavities
127 fastener receptacles
128 lower gasket channel
129 brackets
130 upper housing member
131 body
132 output ports
133 pivot hinge
134 upper gasket channel
135 pressing members
140 closure gasket
145 glands
150 sealing arrangement
151 gasket block arrangement
152 lower part
153 gel block
154 retainers
155 cable channels
156 upper part
157 gel block
158 retainers
159 cable channels
160 retention arrangement
161 body
162 front
163 rear
164 top
165 bottom
166 first side
167 second side
168 fastener apertures
169 recessed surfaces
170 gasket channel
171 sealing member channel
172 tapered structures
173 flange receiving channels
174 cantilevered flanges
175 camming surfaces
176 retention hook
180 sealing member
181 first portion
182 arms
183 closure mating surfaces
184 enlarged section
185 undercut surface
186 upwardly facing surface
187 fastener cutouts
188 legs
189 recesses
190 cavity
191 biasing block
193 pocket
194 fasteners
195 ruggedized adapter
300 outer port
302 ruggedized connector
303 output cable
304 inner ports
306 alignment sleeves
308 nut
310 seal

What is claimed is:

1. An optical termination enclosure comprising:
a lower housing member defining an inner cavity in which optical components can be disposed, the lower housing member having an open top opposite a closed base and having a peripheral wall, the lower housing member defining a sealing receptacle at one end of the peripheral wall and a cable entry port through the one end to provide access to the sealing receptacle;
a sealing arrangement disposed in the sealing receptacle, the sealing arrangement including a retention arrangement that includes:
a wedge-shaped body having a top along which a gasket channel extends between a first side of the body and a second side of the body, the first and second sides of the body also defining a sealing member channel; and
a sealing member disposed in the sealing member channel of the wedge-shaped body, the sealing member having closure mating surfaces that taper inwardly from the top of the wedge-shaped body of the wedge-shaped body.

2. The optical terminal enclosure of claim 1, wherein the sealing arrangement also includes a gasket block arrangement defining at least a first cable aperture sized to receive an optical cable; and wherein the body of the retention arrangement is configured to seat on the gasket block arrangement; and wherein the retention arrangement including cantilevered flanges extending over opposite sides of the gasket block arrangement to define channels that align with the first cable aperture, the cantilevered flanges being configured to apply pressure to the gasket block arrangement.

3. The optical terminal enclosure of claim 2, wherein the gasket block arrangement includes an upper block portion and a lower block portion that cooperate to define the first cable aperture.

4. The optical terminal enclosure of claim 1, wherein the lower housing member and the wedge-shaped body cooperate to define a lower gasket channel; and wherein the sealing member defines upwardly facing surfaces partially in line with the lower gasket channel.

5. The optical terminal enclosure of claim 4, further comprising:
an upper housing member configured to move relative to the lower housing member between a closed position and an open position, the upper housing member extending over the open top of the lower housing member when disposed in the closed position and the upper housing member allowing access to the inner cavity of the lower housing member through the open top when disposed in the open position, the upper housing member defining an upper gasket channel aligned with the lower gasket channel, the upper housing member also including pressing members disposed in alignment with the upwardly facing surfaces of the sealing member and out of alignment with the gasket channels; and
a closure gasket configured to fit in the lower and upper gasket channels when the upper housing member is disposed in the closed position relative to the lower housing member, the closure gasket extending across the upwardly facing surfaces of the sealing member.

6. The optical terminal enclosure of claim 5, wherein the pressing members are disposed within a boundary defined by the upper gasket channel.

7. The optical terminal enclosure of claim 5, wherein the upper housing member defines a plurality of output ports.

8. The optical terminal enclosure of claim 7, further comprising ruggedized adapters mounted at the output ports.

9. The optical terminal enclosure of claim 1, wherein the sealing receptacle has a first section and a second section, the second section defining a plurality of cavities; wherein the sealing arrangement includes a gasket block arrangement configured to be disposed in the first section of the sealing receptacle, the gasket block arrangement defining at least a first cable aperture sized to receive an optical cable; and wherein the retention arrangement is configured to be disposed in the second section of the sealing receptacle.

10. The optical terminal enclosure of claim 9, wherein portions of the sealing member expand into the cavities of the second section of the sealing receptacle when the retention arrangement is disposed in the second section.

11. The optical terminal enclosure of claim 10, wherein the body of the retention arrangement holds a foam block configured to bias a portion of the sealing member outwardly from the body towards the gasket block arrangement.

12. The optical terminal enclosure of claim 1, wherein the sealing member includes a monolithic strip extending along the bottom of the body and along both sides of the body.

13. The optical terminal enclosure of claim 12, wherein the sealing member includes legs that extend downwardly at opposite ends of a gasket block arrangement.

14. The optical terminal enclosure of claim 1, wherein the lower housing member includes fastener receptacles disposed in the sealing receptacle to receive fasteners holding the retention arrangement within the sealing receptacle.

15. An optical termination enclosure comprising:
a lower housing member defining an inner cavity in which optical components can be disposed, the lower housing member having an open top opposite a closed base and having a peripheral wall, the lower housing member defining a sealing receptacle at one end of the peripheral wall and a cable entry port through the one end to provide access to the sealing receptacle;
a sealing arrangement disposed in the sealing receptacle, the sealing arrangement including:
a gasket block arrangement defining at least a first cable aperture sized to receive an optical cable; and
a retention arrangement including a body configured to seat on the gasket block arrangement, the retention arrangement also including cantilevered flanges extending across the gasket block arrangement from a front and rear of the body to define channels providing access to the gasket block arrangement, the cantilevered flanges being configured to apply pressure to the gasket block arrangement.

16. The optical termination enclosure of claim 15, wherein the cantilevered flanges define camming surfaces that face towards the gasket block arrangement, the camming surfaces extend outwardly as the flanges extend away from the body.

17. The optical termination enclosure of claim 15, wherein the cantilevered flanges also including retention hooks configured to fit into openings at the sealing receptacle.

18. An optical termination enclosure comprising:
a lower housing member defining an inner cavity in which optical components can be disposed, the lower housing member having an open top opposite a closed base and having a peripheral wall, the lower housing member defining a sealing receptacle at one end of the peripheral wall and a cable entry port through the one end to provide access to the sealing receptacle, the lower housing member also defining part of a lower gasket channel;
a sealing arrangement disposed in the sealing receptacle, the sealing arrangement including a retention arrangement that includes:
a body having a top along which a gasket channel extends between a first side of the body and a second side of the body in alignment with the part of the lower gasket channel defined by the lower housing member to form the lower gasket channel; and
a sealing member disposed along the first and second sides of the body, the sealing member having closure mating surfaces configured to abut side walls at the sealing receptacle, the sealing member also having upwardly facing surfaces at the first and second sides of the body, each of the upwardly facing surfaces having a first portion disposed in the lower gasket channel and a second portion not disposed in the lower gasket channel;
an upper housing member configured to move relative to the lower housing member between a closed position and an open position, the upper housing member extending over the open top of the lower housing member when disposed in the closed position and the upper housing member allowing access to the inner cavity of the lower housing member through the open top when disposed in the open position, the upper housing member defining an upper gasket channel aligned with the lower gasket channel, the upper housing member also including pressing members disposed in alignment with the second portions of the upwardly facing surfaces of the sealing member; and
a closure gasket configured to fit in the lower and upper gasket channels when the upper housing member is disposed in the closed position relative to the lower housing member, the closure gasket extending across the first portions of the upwardly facing surfaces of the sealing member.

19. The optical termination enclosure of claim 18, wherein the pressing members are disposed inside a boundary defined by the upper gasket channel.

20. An optical termination enclosure comprising:
 a lower housing member defining an inner cavity in which optical components can be disposed, the lower housing member having an open top opposite a closed base and having a peripheral wall, the lower housing member defining a sealing receptacle at one end of the peripheral wall and a cable entry port through the one end to provide access to the sealing receptacle, the sealing receptacle having a first section and a second section, the second section defining cavities; and
 a sealing arrangement disposed in the sealing receptacle, the sealing arrangement including:
  a gasket block arrangement disposed in the first section, the gasket block arrangement defining at least a first cable aperture sized to receive an optical cable; and
  a retention arrangement disposed in the second section, the retention arrangement including a body and a sealing member coupled to the body, the sealing member having a first portion extending between the body and the gasket block arrangement and having second portions extending along sides of the body, the second portions being configured to expand into the cavities defined at the second section of the sealing receptacle when pressure is applied to the sealing member; and the body holding a biasing block configured to bias the first portion of the sealing member outwardly from the body towards the gasket block arrangement.

\* \* \* \* \*